United States Patent [19]

Masaki et al.

[11] Patent Number: 4,566,737

[45] Date of Patent: Jan. 28, 1986

[54] ANTISKID CONTROL WITH WHEEL-SPEED DIFFERENCE COMPENSATION

[75] Inventors: Syouichi Masaki; Kimio Tamura, both of Anjo; Teruyoshi Wakao, Nagoya; Noriyuki Nakashima, Nagoya; Ken Asami, Nagoya; Kazunori Sakai, Nagoya, all of Japan

[73] Assignees: Nippondenso Co., Ltd., Kairya; Toyota Jidosha Kabushiki Kaisha, Toyota, both of Japan

[21] Appl. No.: 638,720

[22] Filed: Aug. 8, 1984

[30] Foreign Application Priority Data

Aug. 9, 1983 [JP] Japan .................................. 58-145258

[51] Int. Cl.$^4$ ................................................ B60T 8/68
[52] U.S. Cl. .................................. 303/109; 188/181 C; 364/426
[58] Field of Search ................. 303/96, 103, 106, 105, 303/108, 109; 188/181 C, 181 A, 181 R; 364/426

[56] References Cited

U.S. PATENT DOCUMENTS

| | | | |
|---|---|---|---|
| 3,673,400 | 6/1972 | Ito | 303/96 |
| 3,802,529 | 4/1974 | Burckhardt et al. | 303/96 |
| 3,802,749 | 4/1974 | Carp et al. | 303/96 |
| 3,966,264 | 6/1976 | Mattori et al. | 303/109 |

Primary Examiner—Duane A. Reger
Assistant Examiner—Alvin Oberley
Attorney, Agent, or Firm—Cushman, Darby & Cushman

[57] ABSTRACT

In an antiskid control system, first and second wheel speed values are derived from pulse signals supplied from wheel speed sensors to indicate respectively the rotational speeds of first and second wheels of the vehicle. A trimming value is derived from the difference between the first and second wheel speed values and used as a multiplier by which the first wheel speed value is multiplied to compensate for the deviation of the speed of the first wheel with respect to the speed of the second wheel. The compensated first wheel speed value compared with a variable threshold that is a function of the speed of the vehicle to determine the down pressure timing.

13 Claims, 13 Drawing Figures

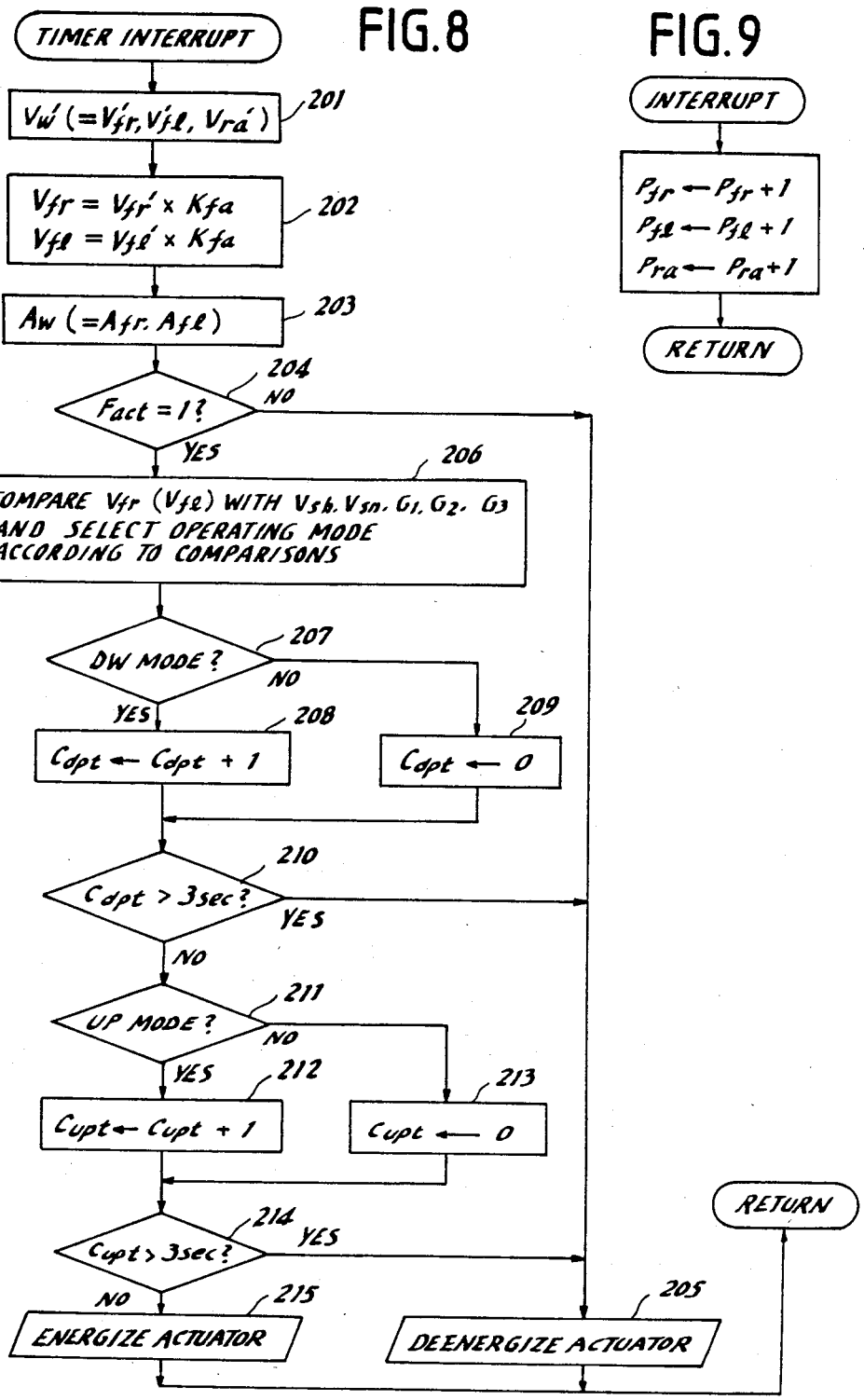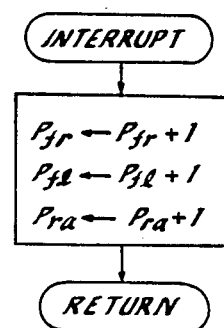

FIG.10
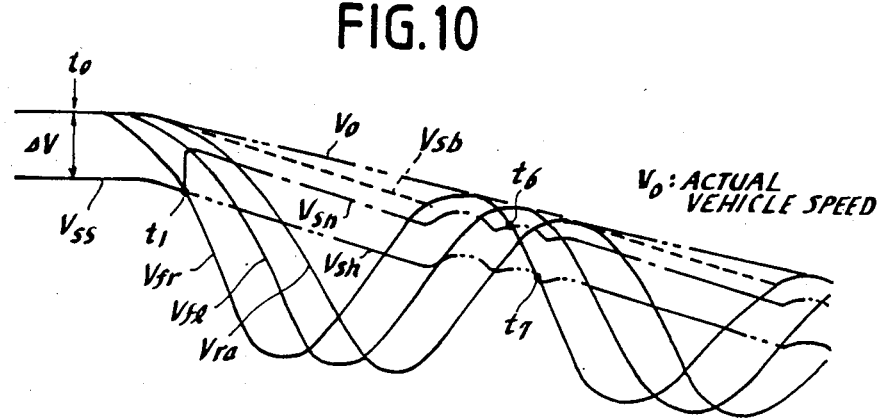
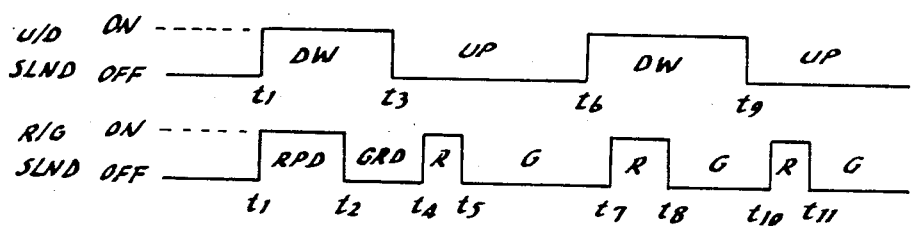
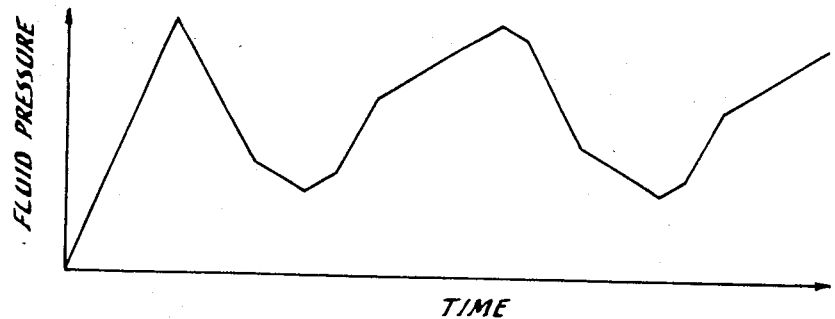

FIG.11
FIG.12
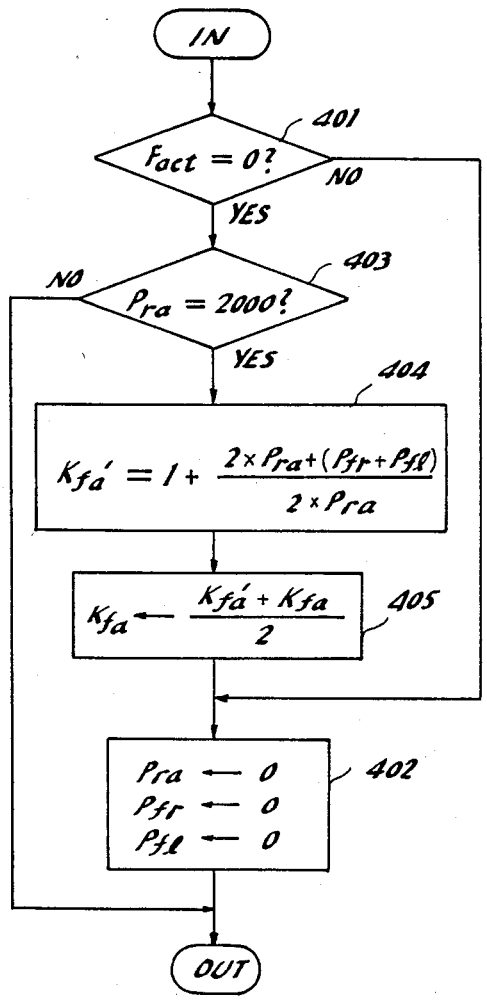
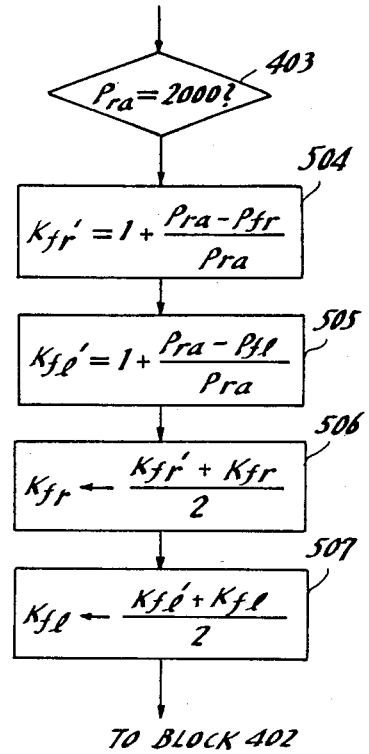

ANTISKID CONTROL WITH WHEEL-SPEED DIFFERENCE COMPENSATION

BACKGROUND OF THE INVENTION

The present invention relates to an antiskid control system.

In conventional antiskid control systems, the down pressure timing of hydraulically operated brakes is determined by a first down pressure decision threshold with which detected wheel speed values are compared and by a second down pressure decision threshold with which wheel acceleration values are compared. With antiskid control systems of this type, the threshold values are estimated from the maximum wheel speed value and comparisons are made between the threshold values and wheel speeds and wheel accelerations to determine the optimum slip rate of the wheels. However, a difference in wheel diameter between wheels results in a false timing down-pressure operation. More specifically, if a given wheel has a lower tire pressure than the other wheels, the diameter of the given wheel is smaller than the others and its apparent wheel speed is greater than the speed of any other wheel and is taken as a maximum wheel speed. Thus, the estimated vehicle speed value is higher than is required for optimum operation of the brakes of the other wheels. Such situations may also occur in a vehicle running on a curved path. On a right-turn curve, for example, the front right wheel would turn at a speed lower than the front left wheel, so that the front right wheel speed becomes smaller than the front left wheel speed and it further reduces below a variable down pressure decision threshold. Down pressure operation thus occurs prematurely and the wheel brake pressure on a wheel following a smaller radius is excessively decreased in comparison with the fluid pressure on a wheel on the other end of the axle.

SUMMARY OF THE INVENTION

Accordingly, the present invention provides an antiskid control system which compensates for speed differences between wheels to optimize the timing of pressure control.

In the antiskid control system of the present invention, first and second wheel speed values are derived from pulse signals supplied from wheel speed sensors to indicate respectively the rotational speeds of first and second wheels of the vehicle. A trimming value is derived from the difference between the first and second wheel speed values and used as a multiplier by which the first wheel speed value is multiplied to compensate for the deviation of the speed of the first wheel with respect to the speed of the second wheel. The compensated first wheel speed value compared with a variable threshold that is a function of the speed of the vehicle to determine the down pressure timing.

BRIEF DESCRIPTION OF THE DRAWINGS

The present invention will be described in further detail with reference to the accompanying drawings, in which:

FIGS. 8 and 9 are flow diagrams describing interrupt routines;

FIG. 10 is a graphic illustration useful for describing the operation of the antiskid control system;

FIG. 11 is a flow diagram describing the detail of the trimming value determination subroutine of FIG. 5; and FIGS. 12 and 13 are modifications of the subroutine of FIG. 11.

DETAILED DESCRIPTION

Figure 1:
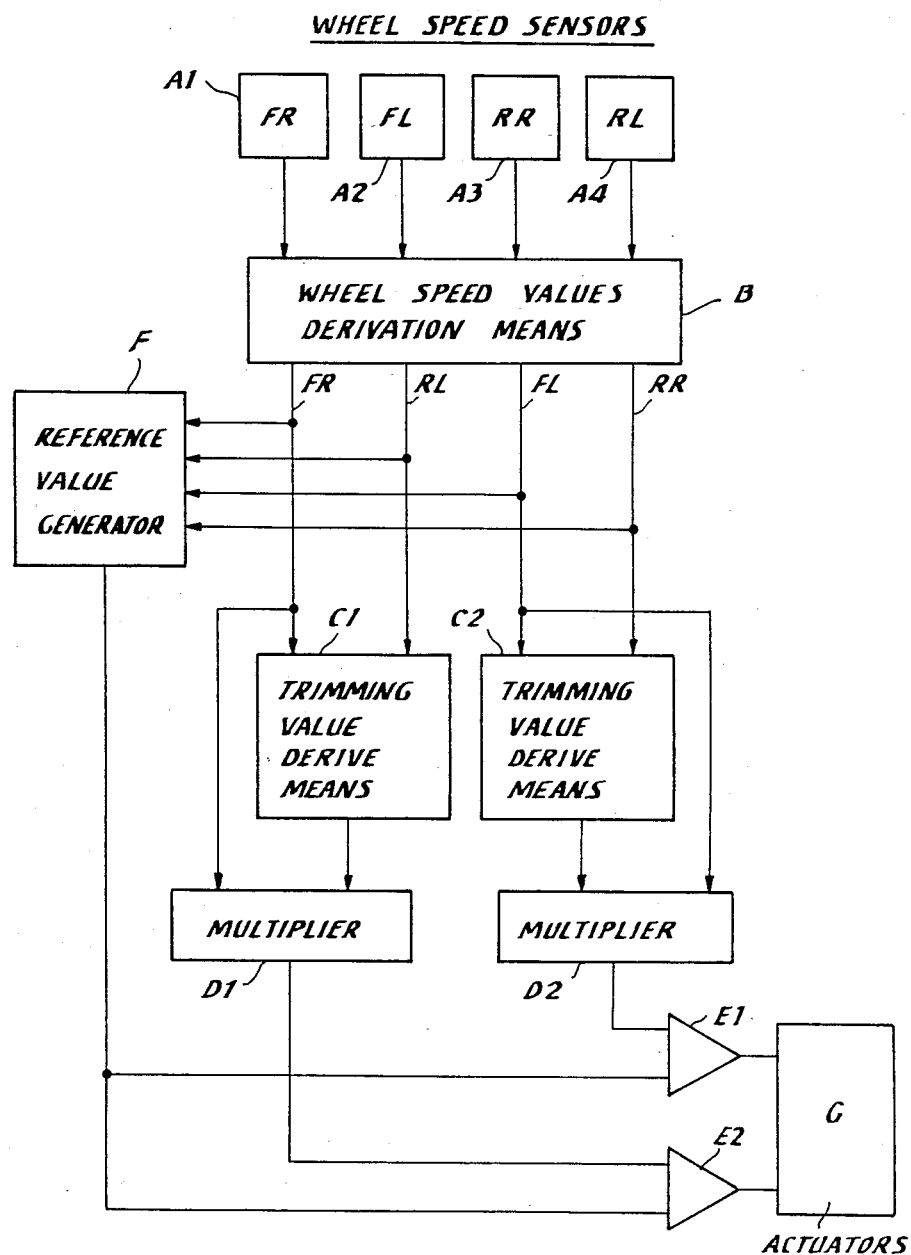
FIG. 1 is a schematic illustration of an antiskid control system embodying the invention.

The antiskid control system of the present invention schematically represented in FIG. 1 comprises generally a plurality of wheel speed sensors $A_1$, $A_2$, $A_3$ and $A_4$ which are respectively associated with front right, front left, rear right and rear left wheels. A wheel speed values derivation means B is connected to the wheel speed sensors to derive wheel speed values representing the rotational speeds of the wheels respectively. The front-right and rear-left wheel speed values FR, RL are applied to a first trimming value derive means $C_1$ and the front-left and rear-right wheel speed values FL and RR are applied to a second trimming value derive means $C_2$. Each of the trimming value derive means detects the difference between the two input signals applied thereto and derive a trimming value from the difference so that when the trimming value is multiplied on the front-right wheel speed value the multiplied value compensates for the deviation of the speed of the front right wheel from the speed of the rear left wheel and likewise when the trimming value is multiplied on the front-left wheel speed value the multipled value compensates for the deviation of the speed of the front left wheel from the speed of the rear left wheel.

The trimming values from derive means C1 and C2 are applied to multipliers D1 and D2, respectively, and the front right wheel speed value FR and front left wheel speed value FL are applied to multipliers D1 and D2, respectively, to perform the multiplications. The multiplied values from the multipliers D1 and D2 are fed to comparators and E1 and E2 respectively for comparison with a reference value which is derived in a reference value generator F. This reference value generator F receives all the wheel speed values FR, RL, FL and RR and detects the highest of the speed values and estimates the vehicle speed from the highest speed value. The reference value supplied to the comparators E1 and E2 are derived from the estimated vehicle speed value so that the reference value varies as a function of the vehicle speed. The comparator outputs are supplied to hydraulic brake pressure actuators G which effects down-pressure operation when the compensated speed values become lower than the reference value.

Figure 2:
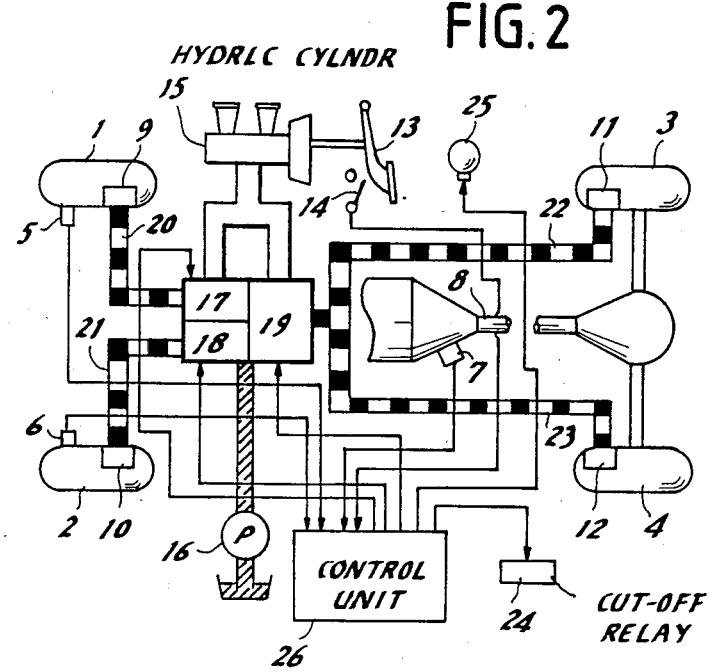
FIG. 2 is an illustration of a mechanical part of the antiskid control system.

FIG. 2 shows a general structure of the antiskid system of the invention incorporated in a rear drive vehicle. Wheel speed sensors 5 and 6 on front-right and front-left wheels 1 and 2 provide front wheel speed signals independently to a control unit 26, and a rear wheel speed sensor 7 is located on a propeller shaft 8 that drives rear-right and rear-left wheels 3 and 4 to provide an average rear wheel speed to the control unit. Pressure control signals are supplied from control unit 26 to solenoid-operated actuators 17, 18, 19 which in turn control pressures of hydraulic brakes 9, 10, 11, 12 mounted on wheels 1, 2, 3, 4 through lines 20, 21, 22, 23, respectively. Brake-pedal ON or OFF signal is fed from stop switch 14 located in proximity to brake pedal 13 to control unit 26. A hydraulic cylinder 15 provides a brake pressure to actuators 17–19 in response to brake pedal 13 being depressed. Solenoid actuators 17–19 are supplied with a constant hydraulic pressure from a pump 16. Control signals are supplied to the actuators 17–19 through a fail-safe cut-off relay 24 from control unit 26. A warning light 25 is provided to alert vehicle passengers when disconnection have occurred in the circuits to the solenoid actuators and stop switch 14.

Figure 3:
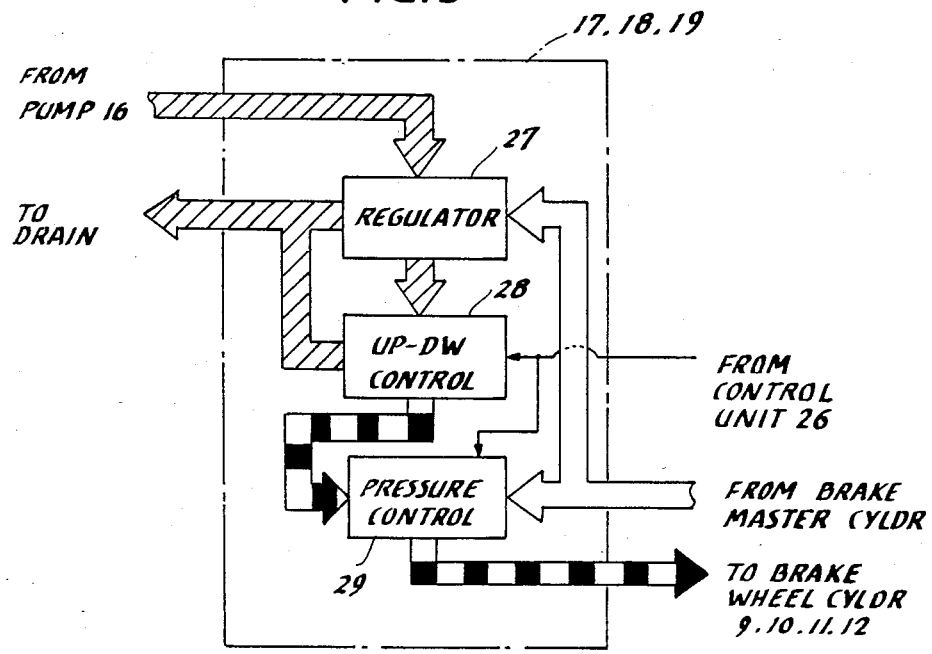
FIG. 3 is an illustration of the detail of the actuators of FIG. 2.

As illustrated in FIG. 3, each of solenoid actuators 17–19 comprises a pressure regulator 27 which is connected to pump 16 to regulate the hydraulic pressure at a constant level. A control valve unit 28 includes a switching solenoid which provides brake pressure up-down control and a pressure control solenoid that controls the gradient of pressure applied to brakes. Further provided is a brake pressure controller 29 including a switching solenoid that provides high pressure variation when energized and low pressure variation when de-energized. The output of controller 29 is connected to the brake wheel cylinder of the associated brake.

Figure 4:
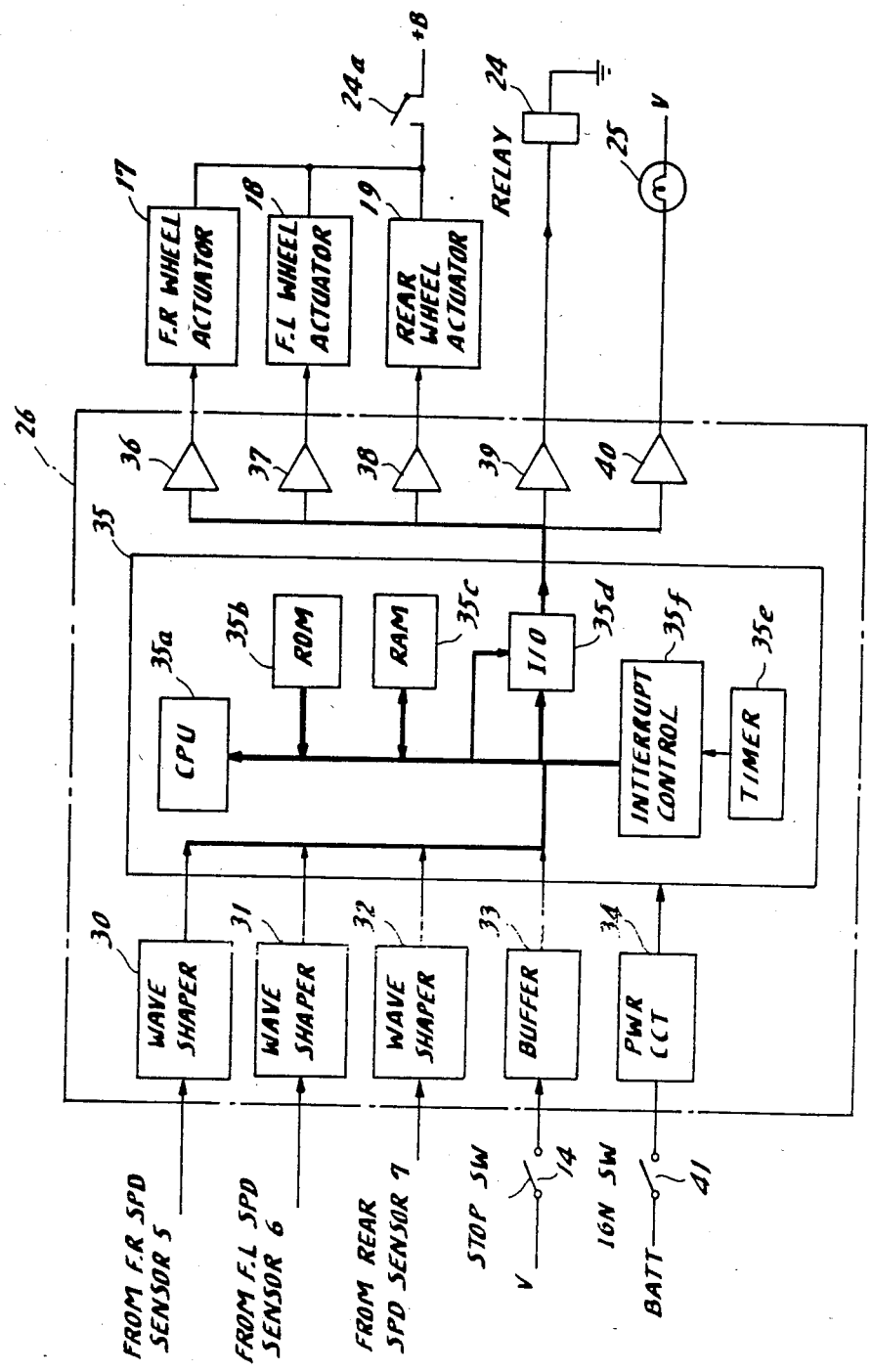
FIG. 4 is an illustration of the detail of the control unit of FIG. 2.

FIG. 4 is an illustration of the detail of control unit 26. Wheel speed signals from sensos 5, 6, 7 are shaped into rectangular pulses by waveshaping circuits 30, 31, 32 and stop signal from switch 14 is fed to a buffer 33. Microcomputer 35, which is powered by circuit 34 in response to ignition switch 41, includes a microprocessor (CPU) 35a that receives these signals through an input/output port 35d to perform operations according to programmed instructions stored in read-only memory 35b. Temporary data are stored in RAM 35c during the process of the microprocessor operating on input data which will be described in detal later. Brake control signals from microcomputer 35 are fed through drivers 36, 37, 38 to solenoid-operated actuators 17, 18, 19, respectively, which are connected in circuit with the relay contacts 24a of cut-off relay 24 which is energized by a driver 39. Driver 40 energizes warning light 25 under control of microcomputer 35. A timer 35e provides a timing pulse at regular intervals to an interrupt control unit 35f which in response to the timing pulse issues an interrupt command to microprocessor 35a. As will be described later, the microprocessor interrupts its main routine execution to execute a timer interrupt subroutine in which it selects an appropriate brake pressure gradient pattern and operates the actuators 17–19.

Figure 5:
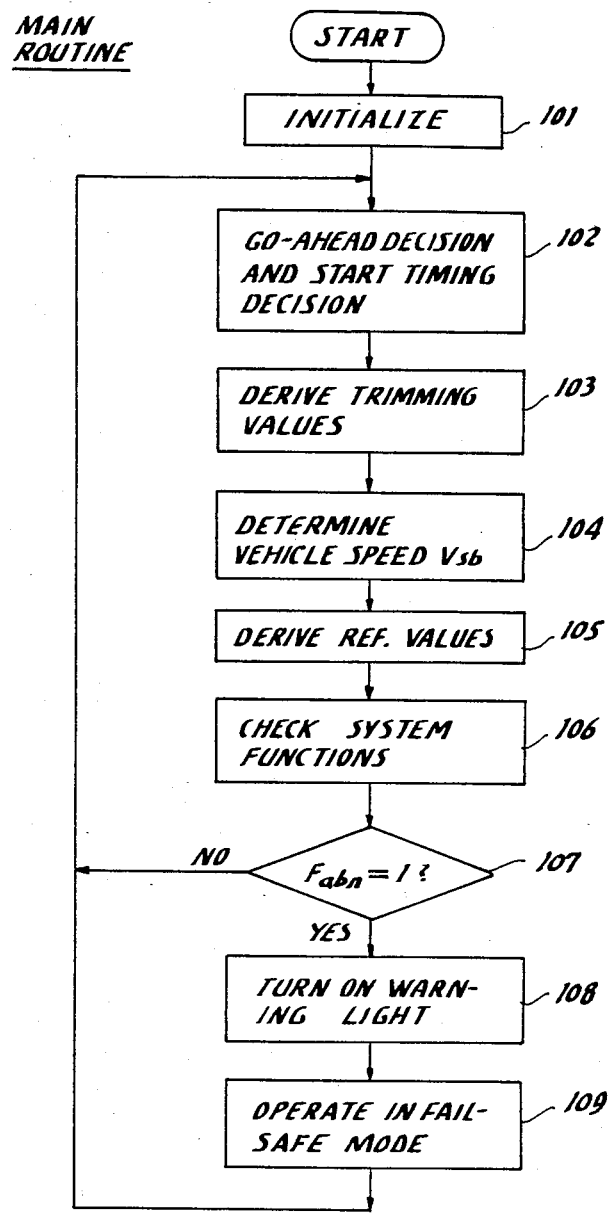
FIG. 5 is an illustration of a flow diagram describing a main routine executed by the microprocessor of FIG. 4.
Figure 6:
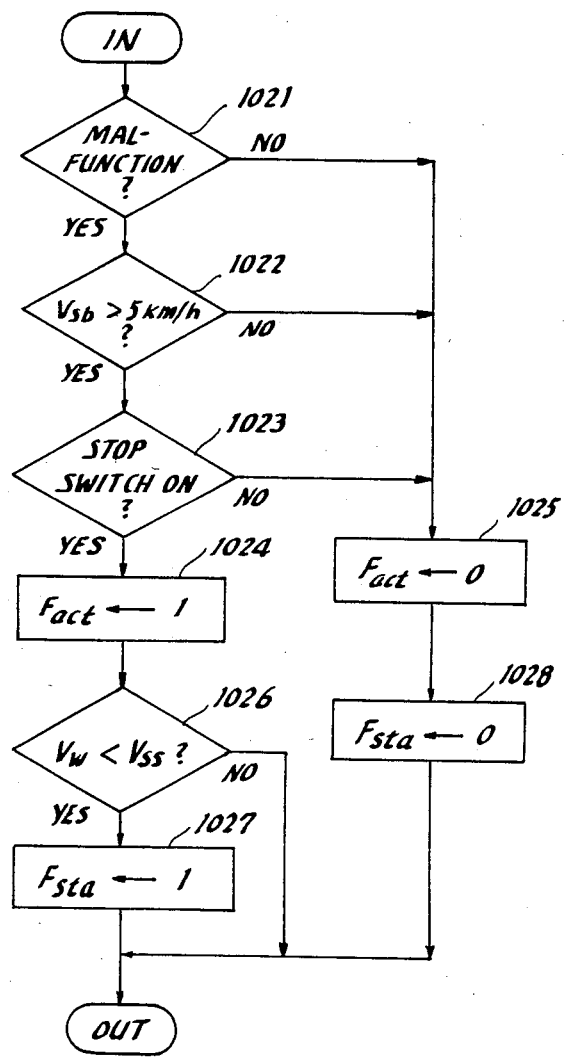
FIG. 6 is a flow diagram of the go-ahead and start timing decision subroutine of FIG. 5.

When ignition switch 41 is turned on, microcomputer 35 initiates executing instructions stored in ROM 35b. Program shown in FIG. 5 starts with a block 101 where various temporary data such as flags are initialized. Control is passed to a subroutine 102 in which antiskid control go-ahead decision and start timing decision are made. As shown in FIG. 6, subroutine 102 comprises three successive steps 1021 to 1023 for making decisions by proceeding with a block 1021 in which the microcomputer checks if the antiskid system is functioning properly. In block 1022, vehicle speed Vsb is compared with a reference speed (5 km/h, for example) to detect if the vehicle is higher than the reference, and in block 1023 the ON-state of stop switch 14 is detected. If these decisions are all affirmative, control is passed to a block 1024 to set go-ahead flag $F_{act}$ and if any one of these decisions is negative control is passed to blocks 1025 and 1028 in succession to reset go-ahead flag $F_{act}$ and control start flag $F_{sta}$, respectively. Block 1026 is then executed to detect if any one of sensed wheel speed values Vw is lower than a reference speed Vss which represents the upper limit for effecting antiskid control. Control is passed to block 1027 to set control start flag $F_{sta}$ if the speed value Vw becomes lower than reference speed Vss.

The microprocessor then advances to a subroutine 103 in which it derives trimming values for right and left front wheel speed values to prevent the occurrence of a down-pressure operation at false timing in a manner as will be described in detail later with reference to FIGS. 11-13.

Figure 7:
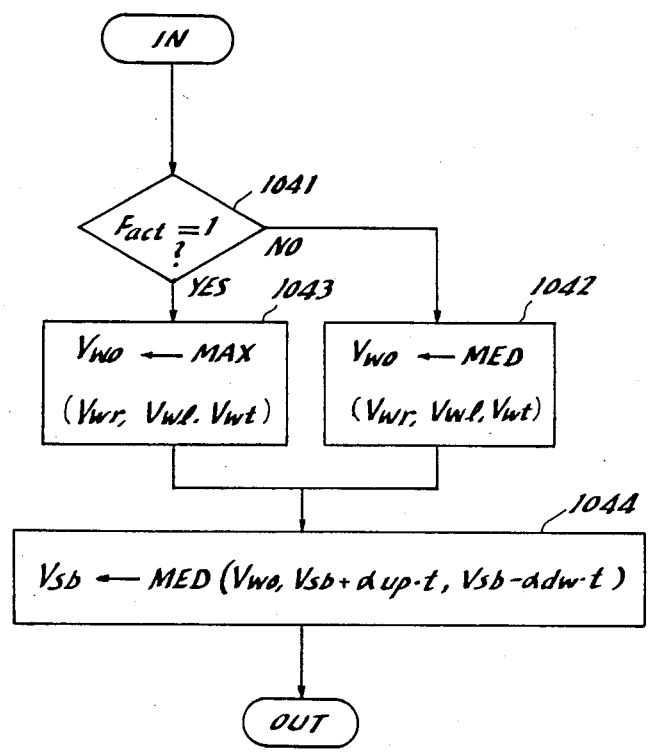
FIG. 7 is a flow diagram describing the vehicle speed estimation subroutine of FIG. 5.

FIG. 7 shows the detail of a vehicle speed estimation subroutine 104 in which the speed of the vehicle is estimated on the basis of wheel speeds. This subroutine includes block 1041 which checks whether a go-ahead flag $F_{act}$ has been set up. If $F_{act}=0$, control is passed to block 1042 to derive a reference wheel speed value Vwo from a medium value of front-right, front-left and rear wheel speed values Vwr, Vwl, Vwt. If $F_{act}=1$, control is passed to block 1043 to derive the reference wheel speed Vwo from the maximum of these wheel speeds. In a subsequent block 1044, a previously derived vehicle speed value Vsb is trimmed by the amount of vehicle acceleration or deceleration and a medium value of the reference speed Vwo and the trimmed vehicle speeds is detected as an estimated value of vehicle speed.

The microprocessor proceeds to subroutine 105 to derive a plularity of threshold values Vr, Ffl, Vsn, Vsh, $G_1$, $G_2$ and $G_3$ as a function of the vehicle speed derived in subroutine 104. The threshold values are used in a timer interrupt routine which will be described to determine the timing at which the braking pressure is altered.

Control now proceeds to subroutine 106 in which the microprocessor checks system's functions such as disconnection and short-circuit condition of speed sensors, under- or over-voltage condition of the power system.

The microprocessor now proceeds to a step 107 to check if there is no abnormal condition, and if not, control jumps to subroutine 102 to repeat the executions described above, and if so, control is passed to a subroutine 108 to energize indicator driver 40 which in turn drives the warning light 25 to alert the vehicle occupant.

A fail-safe subroutine 109 is executed by energizing the cut-off relay 24 to cut off the circuits to the actuators 17–19. Thus, the system is allowed to operate in a manual mode in which the brake pressure is applied in response to the depression of brake pedal in the usual manner.

FIG. 8 is a timer interrupt subroutine which is executed at regular intervals during program execution of the main routine. The interrupt routine starts with block 201 in which wheel speed Vw (including Vfr and Vfl for front right and front left wheel speeds and Vra for rear propeller shaft speed) is determined for each of the wheels based on data obtained in a wheel speed interrupt routine shown in FIG. 9 by which the main routine is also interrupted in response to the occurrrence of each wheel speed pulse. More specifically, three wheel speed interrupt programs are provided having different priorities to count simultaneously occurring wheel speed pulses at different timing by incrementing count values Pfr, Pfl and Pra for wheel speeds Vfr', Vfl' and Vra', respectively, and storing the counts in addressable locations of the RAM. In block 201, the counted wheel speed pulses are read from the RAM to detect the difference between the wheel speed count of the previous execution and that derived in the current execution to derive an instantaneous wheel speed value for each wheel. A trimming value Kfa, which was derived in subroutine 103, is read from the RAM for trimming the instantaneous wheel speed values Vfr', Vfl' and Vra' by multiplication to derive compensated values Vfr, Vfl and Vra.

Wheel acceleration Aw is derived with respect to each wheel in block 203 by taking a difference between instantaneous wheel speed values successively derived in block 202. In blocks 201 and 203 digital filtering techniques may be employed to smooth out insignificant fluctuations.

Control is now passed to block 204. If go-ahead decision is not present, control is jumped to block 205 to deenergize actuators 17-19 so that they return to inoperative state immediately following the go-ahead flag $F_{act}$ being reset. If $F_{act}=1$ in block 203, control is passed to block 206 to compare wheel speed and acceleration values Vw, Aw with reference values Vsn, Vsh, $G_1$, $G_2$ and $G_3$.

An optimum operating mode is selected according to the results of the comparisons. The operation of the actuators 17-19 will be visualized with reference to FIG. 10. Each actuator includes an up/down pressure control solenoid and a rapid/gradual control solenoid. The on-off states of these solenoids determine a fluid pressure gradient. It is assumed that upon the application of brakes the peaks and valleys of the front right speed Vfr occur first followed by those of the front left speed Vfl and the rear speed Vra in sequence, crossing variable thresholds Vsn and Vsh for making of gradual and rapid down-pressure timing decisions, respectively. For purposes of simplicity, the operation will be described with reference to the front right speed value Vfr. Brake is applied at time $t_0$ with an accompanying reduction in speed value Vfr below the antiskid initiation threshold Vss. When accleration Aw decreases below threshold $G_1$ at time $t_1$, antiskid control is initiated and both solenoids are energized to provide a rapid down-pressure operation. The fluid pressure in the braking system is rapidly reduced, loosening the brake on front right wheel. The speed reduction rate of the front right wheel thus decreases. On the other hand, the acceleration Aw of this wheel begins to rise and at time $t_2$ it exceeds the threshold $G_1$. When this occurs, the rapid/gradual switching solenoid is turned off, switching the down-pressure operation to a gradual mode. When Afr rises above threshold $G_2$ at time $t_3$, up/down control solenoid is deenergized to gradually increase the fluid pressure. Wheel acceleration continues even though the fluid pressure is gradually increased and at time $t_4$ it exceeds the highest threshold $G_3$, so that rapid/gradual switching solenoid is energized to provide a rapid up-pressure operation until time $t_5$ whereat acceleration Afr reduces below $G_3$. The rapid/gradual solenoid is again deenergized during the period between times $t_5$ and $t_6$ in which Vfr remains below Vsn, so that the fluid pressure is gradually increased. At time $t_6$, acceleration Afr reduces below $G_1$ to turn on the up/-down control solenoid until Vfr drops below Vsh at time $t_7$, causing a gradual down-pressure operation. The rapid/gradual control solenoid is again turned on at time $t_7$ as Vfr reduces below Vsh, switching the operation to rapid down mode. The above process is repeated so that the solenoids are operated in one the binary states as indicated by a waveform shown at the bottom of FIG. 10.

Control is then advanced to block 207 to check if a down-pressure mode is selected and if so, a down-pressure time counter $C_{dpt}$ is incremented by one in block 208, and if not this counter is reset in block 209.

In block 210, the microprocessor checks if down-pressure time counter $C_{dpt}$ exceeds a preset limit, typically 3 seconds, and if so, the actuators 17-19 are deenergized in block 205 and if not, control is passed to block 211 to detect if the selected mode is an up-pressure mode and if so, an up-pressure time counter $C_{upt}$ is incremented by one in block 212, and if not, this counter is reset in block 213. If the ccunter $C_{upt}$ indicates a 3-second period (block 214), actuators are deenergized (block 205), and if not, they remain energized (block 215).

Referring now to FIG. 11, one embodiment of the trimming value derivation subroutine 103 is illustrated. If go-ahead flag $F_{act}$ is set up in subroutine 102, a "no" decision is taken in block 401 to reset all wheel speed values Pra, Pfr and Pfl to zero in block 402 and control advances to the next subroutine 104. With $F_{act}=0$, control is passed to block 403 to check if the rear wheels have travelled 100 meters. This is accomplished by comparing the count value Pra with a reference value 2000, for example, if the wheel speed sensor generates a pulse as rear wheels travel a distance of 5 centimeters. Each time the rear wheels has travelled 100 meters, control is passed to block 404 to derive a trimming value Kfa' from Equation 1, $$Kfa' = 1 + \frac{2 \times Pra - (Pfr + Pfl)}{2 \times Pra} \qquad (1)$$

where, Pra, Pfr and Pfl are pulse count values obtained in interrupt routine of FIG. 12. In Equation 1 the term "$2 \times Pra$" represents twice an average wheel speed value of rear wheels 3 and 4 and the term (Pfr+Pfl) represents the combined wheel speeds of front wheels 1 and 2. The difference between these terms is taken and divided by twice the average rear wheel speed value Pra. The trimming value Kfa' thus represents an amount by which the front wheel average speed deviates with respect to the rear wheel average speed.

Control is advanced to block 405 to derive an average value of the trimming values Kfa' by summing up successively derived trimming values and dividing the sum by 2. This averaging effect eliminates an error which might be introduced to the pulse counts due to external noise. After execution of block 405, all the wheel speed count values are reset in block 402.

Thus, trimming value Kfa is derived at intervals of 100 meters of rear wheel movement during the period when the go-ahead decision flag $F_{act}$ is in a reset condition and stored in the RAM for later retrieval during a subsequent antiskid operation. In the timer interrupt routine of FIG. 11a, the trimming value Kfa is retrieved from the RAM when control arrives at block 202 to multiply the wheel speed values Vrf and Vfl, whereby the difference in front wheel speeds arising from the difference in diameter between the front right and front left wheels or arising from the cornering operation of the vehicle, is compensated.

The derivation of the trimming value during the period $F_{act}=0$ has the effect of avoiding rear wheel locking conditions which are likely to occur during antiskid control and which would introduce an error if the computations are made during such conditions. The periodic derivation of the trimming value enables an account to be taken of variations on wheels which occur with time.

It is seen that the corrected wheel speed values Vfr and Vfl are compared with the down-pressure descision making thresholds Vsn and Vsh in subroutine 206, FIG. 8, and therefore down-pressure operations are performed at optimum timing even when the vehicle is cornering or there is a difference in diameter between wheels.

The subroutine 103 of FIG. 11 is modified as shown in FIG. 12 in which blocks 404 and 405 of FIG. 16 are replaced with blocks 504 to 507. In block 504, a trimming value Kfr' for the front right wheel is derived from the following equation:

$$Kfr' = 1 + \frac{Pra - Pfr}{Pra}$$

The second term of this equation represents the ratio by which the front right wheel speed deviates from rear average speed value Pra.

In block 505, a trimming value Kfl' is likewise derived by taking the difference between rear average count and front left wheel count Pfl and dividing it by Pra to derive a ratio by which the front left wheel speed deviates from the rear average speed value, the quotient being summed with a unity as in the above equation. Control is passed to block 506 to sum the trimming value Kfr' with the trimming value Kfr derived in the previous program execution and dividing it by 2 to obtain an average of successive trimming values. Similar computations are performed in block 507 on the front left wheel value to derive an average value Kfl.

The front right and left wheel trimming values Kfr and Kfl are stored in the RAM and retrieved as the subroutine 202 of the timer interrupt routine, FIG. 11a, is executed. Instead of the trimming value Kfa the values Vfr' and Vfl' are multiplied by Kfr and Kfl, respectively.

In the previous embodiments, the rear wheel speeds are derived as an average value using a single wheel speed sensor 7. In a modified embodiment which will be described with reference to FIG. 13, wheel speeds are individually detected by rear-right and rear-left wheel speed sensors to store count values Prr and Prl respectively in the sensor interrupt routine of FIG. 9 in addition to front wheel count values Pfr and Pfl.

Figure 13:
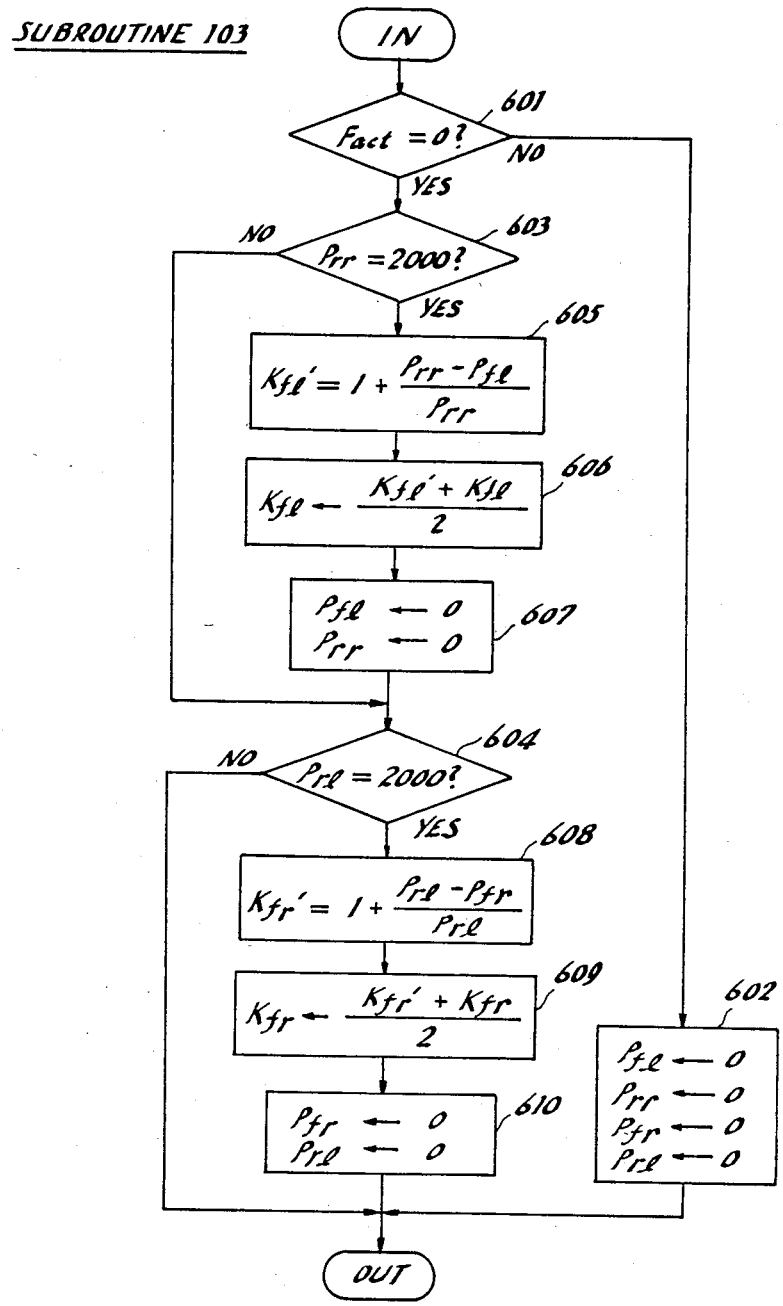

With $F_{act}=0$ in block 601, in FIG. 13, block 603 is executed by detecting whether rear right wheel count Prr has reached 2000 and if so, control is passed to block 605 to provide the following computations:

$$Kfl' = 1 + \frac{Prr - Pfl}{Prr}$$

The second term of this equation represents the ratio by which the front left wheel speed differs from the speed of the wheel diagonally located with respect to the front left wheel, i.e. rear right wheel. An average trimming value Kfl is derived from the current value Kfl' and the previously obtained value Kfl. Control is passed to block 607 to reset counts Pfl and Prr to zero and proceeds to block 604 to check if count Prl has reached 2000. Block 604 is also executed if Prr has not reached 2000 in block 603. Likewise, if Prl is not 2000 in block 604, control is passed to the next subroutine 104. With Prl=2000, block 608 is executed to perform the following computations:

$$Kfr' = 1 + \frac{Prl - Pfr}{Prl}$$

Since the second term of this equation represents the ratio by which the front right wheel speed deviates from rear left wheel speed, the trimming value Kfr' for front right wheel compensates for a diagonal speed deviation with respect to the front right wheel. Average value Kfr is obtained in block 609 and counts Pfr and Prl are reset in block 610. During the period when antiskid control is not performed, all the count values are reset to zero in block 602.

In the foregoing description, wheel speed sensors are assumed to be of identical type so that the number of pulses generated for a given amount of travel is equal to one another. If different types of sensors are employed for individual wheels, correction must be made in the subroutine 201 to calibrate the wheel speed values Vw. For example, if front wheel speed sensor generates 60 pulses per revolution while rear wheel sensor generates 75 pulses per revolution, the computations provided by the step 404, FIG. 11, should be rewritten as follows:

$$Kfa' = 1 + \frac{2.5 \times Pra(Pfr + Pfl)}{2.5 \times Pra}$$

Otherwise, the front wheel speed value derived in the subroutine 201 should be modified to take into account the pulse number ratio as follows:

$$Vw' = Kr \cdot P/\Delta t$$

where, Kr is a constant associated with the rear wheel speed which has relationship Kf:Kf=60:75 (where Kf is a constant associated with the front wheel), P represents the number of pulses generated during an elaspsed time $\Delta t$. At the same time, the trimming value Kfa should be initialized to a value 0.75 in the initializing subroutine 101, FIG. 5, which will be updated in a subsequent program execution. The value "0.75" is derived from the equation of the step 404 by substituting count value 75 for variables Pfr and Pfl and substituting count value 60 for variable Pra.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. An antiskid control system for the hydraulic braking system of a wheeled vehicle having at least first and second wheels, first and second wheel speed sensors respectively associated with said wheels, and means for decreasing the fluid pressure of the braking system in response to a pressure control signal applied thereto, comprising:

means for deriving from the outputs of said wheel speed sensors first and second wheel speed values respectively representing the rotational speeds of said first and second wheels;

means for deriving a trimming value from the difference between said first and second wheel speed values;

means for multiplying said first wheel speed value by said trimming value to compensate for the deviation of the speed of said first wheel from the speed of said second wheel; and means for comparing said compensated first wheel speed value with a variable threshold that is a function of the speed of said vehicle and generating said pressure control signal.

2. An antiskid control system as claimed in claim 1, wherein said first wheel is a driven wheel and said second wheel is a driving wheel.

3. An antiskid control system for the hydraulic braking system of a wheeled vehicle having a pair of first and second driven wheels and a pair of first and second driving wheels, a plurality of wheel speed sensors respectively associated with said driven and driving wheels, and means for decreasing the fluid pressure of the braking system in response to a pressure control signal applied thereto, comprising:

means for deriving from the outputs of said wheel speed sensors first and second wheel speed values respectively representing the rotational speeds of said first and second driven wheels and a third wheel speed value representing an average speed of said first and second driving wheels;

means for deriving a first trimming value from the difference between said first speed value and said third speed value and a second trimming value from the difference between said second speed value and said third speed value;

means for multiplying said first speed value by said first trimming value to compensate for the deviation of the speed of the first driven wheel from the average speed of the driving wheels and multiplying said second wheel speed value by said second trimming value to compensate for the deviation of the second driven speed from said average speed; and means for comparing said compensated first and second speed values with a variable threshold that is a function of the speed of said vehicle and generating said pressure control signal.

4. An antiskid control system for the hydraulic braking system of a wheeled vehicle having a pair of first and second driven wheels and a pair of first and second driving wheels which are diagonally located with respect to said second and first driven wheels, respectively, a plurality of wheel speed sensors respectively associated with said driven and driving wheels, and means for decreasing the fluid pressure of the braking system in response to a pressure control signal applied thereto, comprising:

means for deriving from the outputs of said wheel speed sensors first and second wheel speed values respectively representing the rotational speeds of said first and second driven wheels and third and fourth wheel speed values respectively representing the rotational speeds of said first and second driving wheels;

means for deriving a first trimming value from the difference between said first and fourth speed values and a second trimming value from the difference between said second and third speed values;

means for multiplying said first speed value by said first trimming value to compensate for the deviation of the speed of the first driven wheel from the speed of said fourth driving wheel and multiplying said second speed value by said second trimming value to compensate for the deviation of the speed of the second driven wheel from the speed of said third driven wheel; and means for comparing said compensated first and second wheel speed values with a variable threshold that is a function of the speed of said vehicle and generating said pressure control signal.

5. An antiskid control system for the hydraulic braking system of a wheeled vehicle having at least first and second wheels, first and second wheel speed sensors associted with said wheels, and means for decreasing the fluid pressure of the braking system in response to a pressure control signal applied thereto, comprising:

data processing means programmed to perform the steps of:

(a) deriving from the outputs of said wheel speed sensors first and second wheel speed values respectively representing the rotational speeds of said first and second wheels;

(b) deriving a trimming value from the difference between said first and second wheel speed values for compensating for the deviation of the speed of said first wheel with respect to the speed of said second wheel;

(c) multiplying said first wheel speed value by said trimming value to compensate for the deviation of the first speed value from said second wheel speed value; and (d) comparing said compensated first wheel speed value with a variable threshold that is a function of the speed of said vehicle and generating said pressure control signal.

6. An antiskid control system as claimed in claim 5, wherein said data processing means is programmed to perform the steps of:

(A) prior to the step (a), detecting when said braking system is in a non-operating state;

(B) if said non-operating state is detected, measuring a distance travelled by one of said wheels;

(C) detecting when the measured distance reaches a predetermined value; and (D) repeating the steps (a) to (d) and the steps (A) to (C).

7. An antiskid control system as claimed in claim 5, wherein said data processing means is further programmed to perform the steps of deriving an average value of successively derived trimming values and substituting the average trimming value for the trimming value of the step (c).

8. An antiskid control system for the hydraulic braking system of a wheeled vehicle having a pair of first and second driven wheels and a pair of first and second driving wheels, first and second wheel speed sensors associated respectively with said wheels, and means for decreasing the fluid pressure of the braking system in response to a pressure control signal applied thereto, comprising:

data processing means programmed to perform the steps of:

(a) deriving from the outputs of said wheel speed sensors first and second wheel speed values respectively representing the rotational speeds of said first and second driven wheels and a third wheel speed value representing an average speed of said first and second driving wheels;

(b) deriving a first trimming value from the difference between said first speed value and said third speed value;

(c) deriving a second trimming value from the difference between said second speed value and said third speed value;

(d) multiplying said first speed value by said first trimming value to compensate for the deviation of the speed of the first driven wheel from the average speed of the driving wheels;

(e) multiplying said second wheel speed value by said second trimming value to compensate for the deviation of the second driven speed from said average speed; and (f) comparing said compensated first and second speed values with a variable threshold that is a function of the speed of said vehicle and generating said pressure control signal.

9. An antiskid control system as claimed in claim 8, wherein said data processing means is programmed to perform the steps of:

(A) prior to the step (a), detecting when said braking system is in a non-operating state;

(B) if said non-operating state is detected, measuring a distance travelled by one of said wheels;

(C) detecting when the measured distance reaches a predetermined value; and (D) repeating the steps (a) to (f) and the steps (A) to (C).

10. An antiskid control system as claimed in claim 8, wherein said data processing means is further programmed to perform the steps of deriving an average value of successively derived first trimming values and substituting the average first trimming value for the first trimming value of the step (d), deriving an average value of successively derived second trimming values and substituting the average second trimming value for the second trimming value of the step (e).

11. An antiskid control system for the hydraulic braking system of a wheeled vehicle having a pair of first and second driven wheels and a pair of first and second driving wheels which are diagonally located with respect to said second and first driven wheels, respectively, a plurality of wheel speed sensors respectively associated with said driven and driving wheels, and means for decreasing the fluid pressure of the braking system in response to a pressure control signal applied thereto, comprising:

data processing means programmed to perform the steps of:

(a) deriving from the outputs of said wheel speed sensors first and second wheel speed values respectively representing the rotational speeds of said first and second driven wheels and third and fourth wheel speed values respectively representing the rotational speeds of said first and second driving wheels;

(b) deriving a first trimming value from the difference between said first and fourth speed values;

(c) deriving a second trimming value from the difference between said second and third speed values;

(d) multiplying said first speed value by said first trimming value to compensate for the deviation of the speed of the first driven wheel from the speed of said fourth driving wheel;

(e) multiplying said second speed value by said second trimming value to compensate for the deviation of the speed of the second driven wheel from the speed of said third driven wheel; and (f) comparing said compensated first and second wheel speed values with a variable threshold that is a function of the speed of said vehicle and generating said pressure control signal.

12. An antiskid control system as claimed in claim 11, wherein said data processing means is programmed to perform the steps of:

(A) prior to the step (a), detecting when said braking system is in a non-operating state;

(B) if said non-operating state is detected, measuring a distance travelled by one of said wheels;

(C) detecting when the measured distance reaches a predetermined value; and (D) repeating the steps (a) to (f) and the steps (A) to (C).

13. An antiskid control system as claimed in claim 11, wherein said data processing means is further programmed to perform the steps of deriving an average value of successively derived first trimming values and substituting the average first trimming value for the first trimming value of the step (d), deriving an average value of successively derived second trimming values and substituting the average second trimming value for the second trimming value of the step (e).

* * * * *